United States Patent
Mitrea et al.

(10) Patent No.: US 10,262,438 B2
(45) Date of Patent: Apr. 16, 2019

(54) METHODS AND DEVICES FOR PRODUCING AND PROCESSING REPRESENTATIONS OF MULTIMEDIA SCENES

(75) Inventors: Mihai Petru Mitrea, Savigny sur Orge (FR); Bojan Joveski, Paris (FR); Ludovico Gardenghi, L'Hay les Roses (FR); Iain James Marshall, St. Pierre les Nemours (FR); Francoise Preteux, Paris (FR)

(73) Assignees: PROLOGUE, Les Ulis (FR); ASSOC. POUR LA RECHERCHE ET LE DEVELOPPEMENT DE METHODES ET PROCESSUS INDUSTRIELS "ARMINES", Paris (FR); INSTITUT MINES-TELECOM, Paris (FR)

( * ) Notice: Subject to any disclaimer, the term of this patent is extended or adjusted under 35 U.S.C. 154(b) by 60 days.

(21) Appl. No.: 14/112,916

(22) PCT Filed: Apr. 18, 2012

(86) PCT No.: PCT/FR2012/050849
§ 371 (c)(1),
(2), (4) Date: Mar. 5, 2014

(87) PCT Pub. No.: WO2012/172212
PCT Pub. Date: Dec. 20, 2012

(65) Prior Publication Data
US 2014/0168218 A1    Jun. 19, 2014

(30) Foreign Application Priority Data
Apr. 19, 2011    (FR) .................................... 11 53387

(51) Int. Cl.
*G06T 9/00*    (2006.01)
*H04N 21/234*    (2011.01)
(Continued)

(52) U.S. Cl.
CPC ............ *G06T 9/001* (2013.01); *H04N 19/25* (2014.11); *H04N 21/23412* (2013.01);
(Continued)

(58) Field of Classification Search
CPC ...................................................... G06T 9/001
(Continued)

(56) References Cited

U.S. PATENT DOCUMENTS 6,738,967 B1 *  5/2004  Radigan .................... G06F 8/47
                                                   717/146
8,296,378 B2 * 10/2012  Huynh ..................... H04L 29/06
                                                   709/206
(Continued)

FOREIGN PATENT DOCUMENTS

FR    2 902 908    12/2007
FR    2 917 880    12/2008

OTHER PUBLICATIONS

International Search Report and Written Opinion dated Jul. 24, 2012 from International Application No. PCT/FR2012/050849 filed Apr. 18, 2012, pp. 1-11.
(Continued)

*Primary Examiner* — Hai Tao Sun
(74) *Attorney, Agent, or Firm* — MH2 Technology Law Group, LLP

(57) ABSTRACT

The representation of content, in a scene representation, is enriched with a view to the adaptive use of the latter according to a set of common parameters. A sub-graph of the scene graph, which is susceptible to variable processing, is identified. For this purpose, two new types of scene element can be defined, one of which allows the identification of the sub-graph and the second enables application of the set of common parameters in relation to the sub-graph. An example of the first type is a node of so-called "Adaptivi-
(Continued)

tyControl" type which encompasses the entire sub-graph, a list of the nodes describing the set of common parameters and a group of fields for dynamic updating of the content of this node. An example of the second type is a node of so-called "CompressedImageStrategy" type which comprises information relating to the object to be coded and the coding parameters.

19 Claims, 13 Drawing Sheets

(51) Int. Cl.
*H04N 21/44* (2011.01)
*H04N 21/2343* (2011.01)
*H04N 21/8543* (2011.01)
*H04N 19/25* (2014.01)

(52) U.S. Cl.
CPC ........... *H04N 21/234318* (2013.01); *H04N 21/44012* (2013.01); *H04N 21/8543* (2013.01)

(58) Field of Classification Search
USPC ........................................................ 345/420
See application file for complete search history.

(56) References Cited

U.S. PATENT DOCUMENTS

| | | | | |
|---|---|---|---|---|
| 2002/0060678 | A1* | 5/2002 | Sowizral | G06T 15/005 345/420 |
| 2003/0007694 | A1* | 1/2003 | Lee | G06T 9/004 382/238 |
| 2003/0110236 | A1* | 6/2003 | Yang | H04L 29/06 709/219 |
| 2004/0196299 | A1* | 10/2004 | Di Lelle | G06T 15/503 345/619 |
| 2005/0188112 | A1* | 8/2005 | Desai | H04L 47/10 709/247 |
| 2005/0243090 | A1* | 11/2005 | Schneider | G06T 17/005 345/440 |
| 2012/0158687 | A1* | 6/2012 | Fang | G06N 5/02 707/706 |

OTHER PUBLICATIONS

Dufourd, Jean-Claude. BIFS: Scene Description, Chapter 4, MPEG-4 Book, Jul. 10, 2002, pp. 103-147, Prentice Hall, US.

* cited by examiner

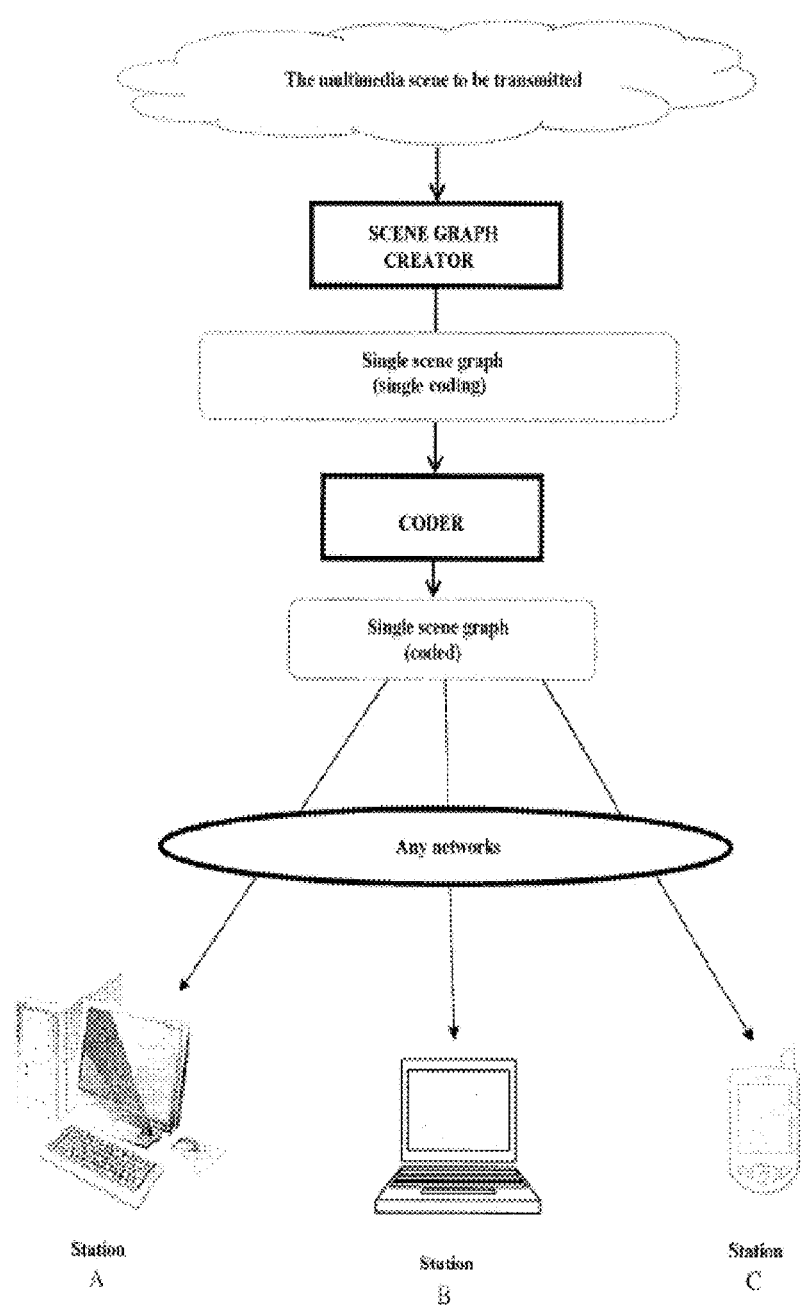
FIGURE 1 – PRIOR ART

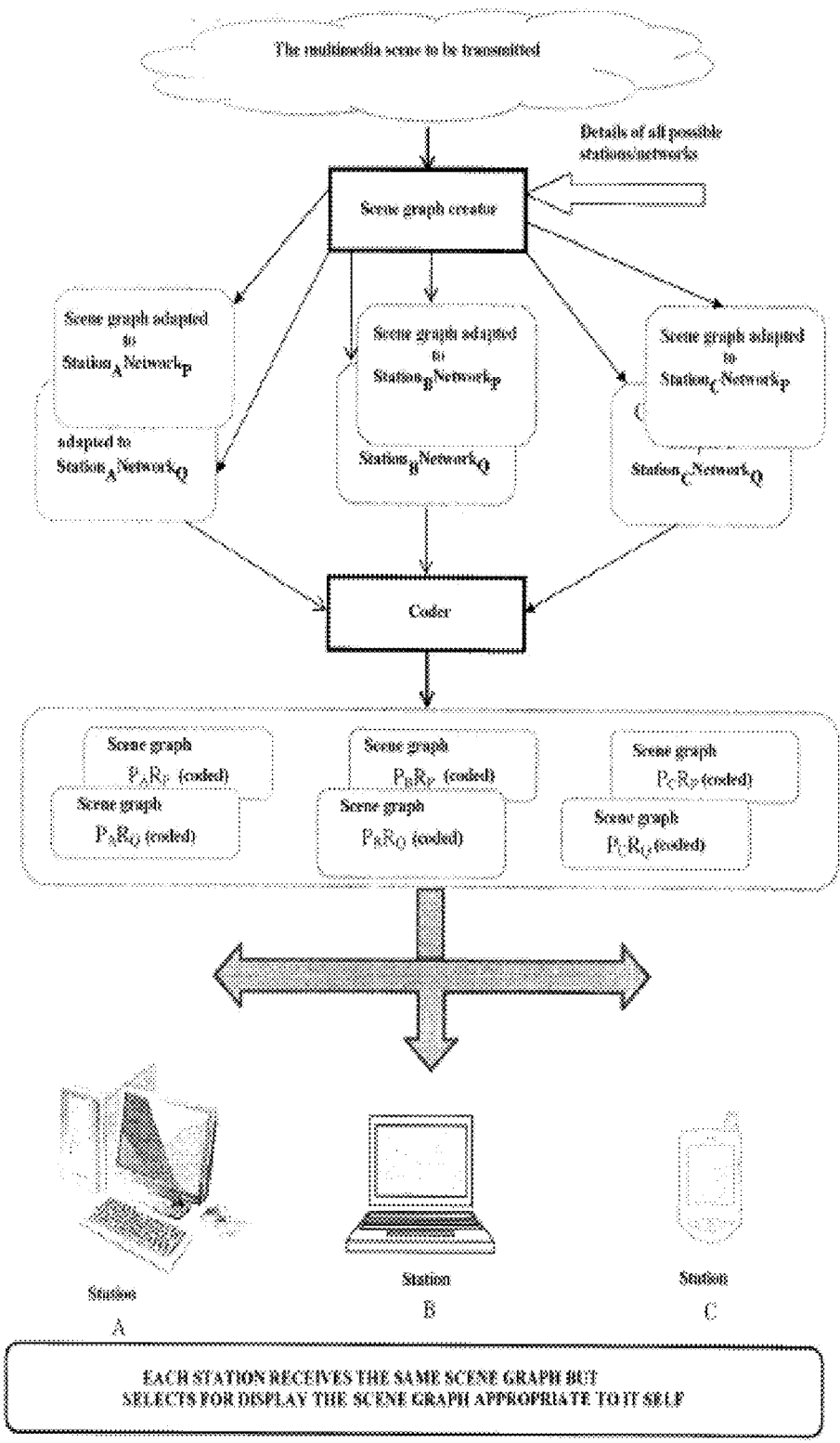
FIGURE 2(a) – PRIOR ART

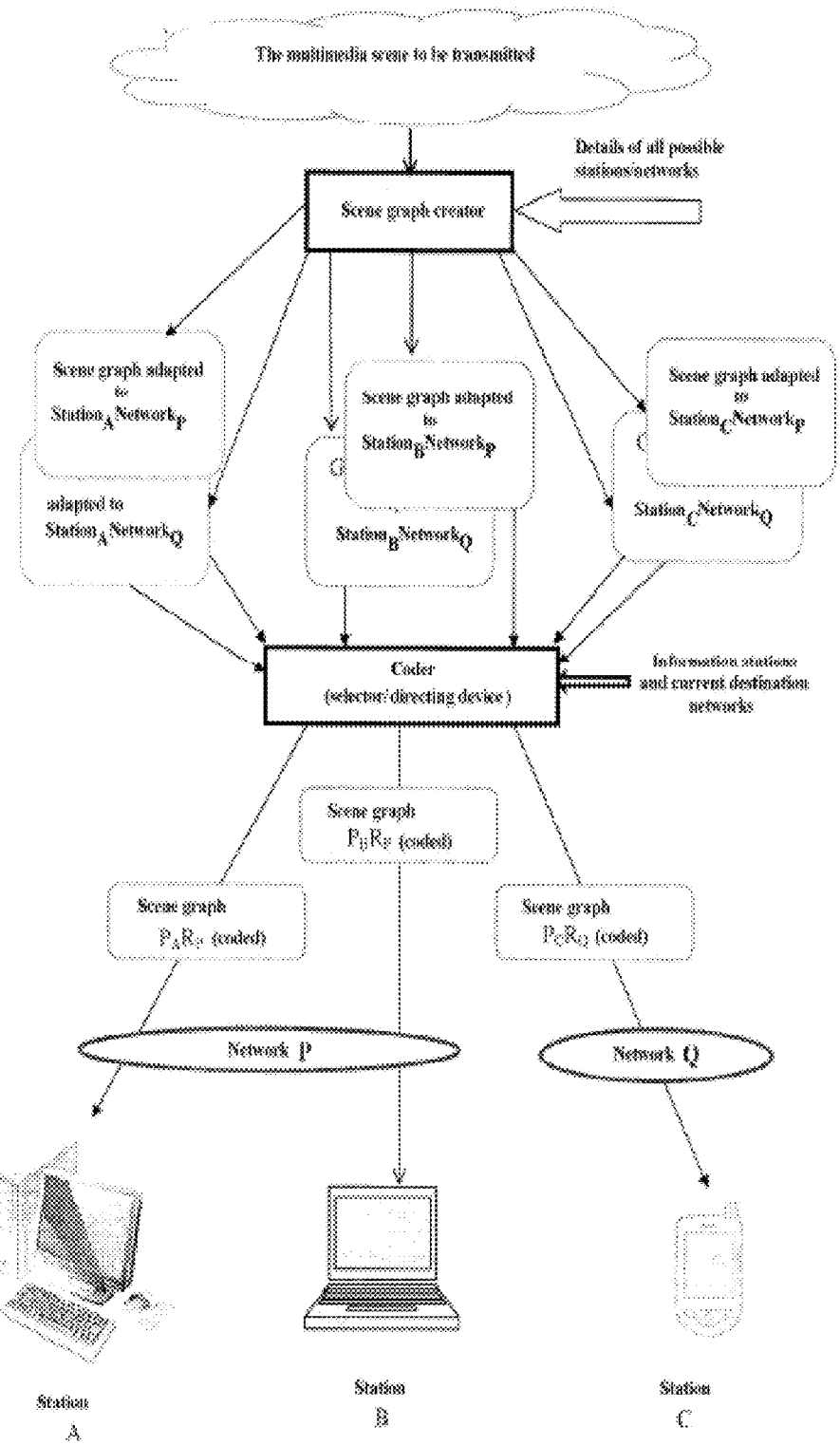
FIGURE 2(b) – PRIOR ART

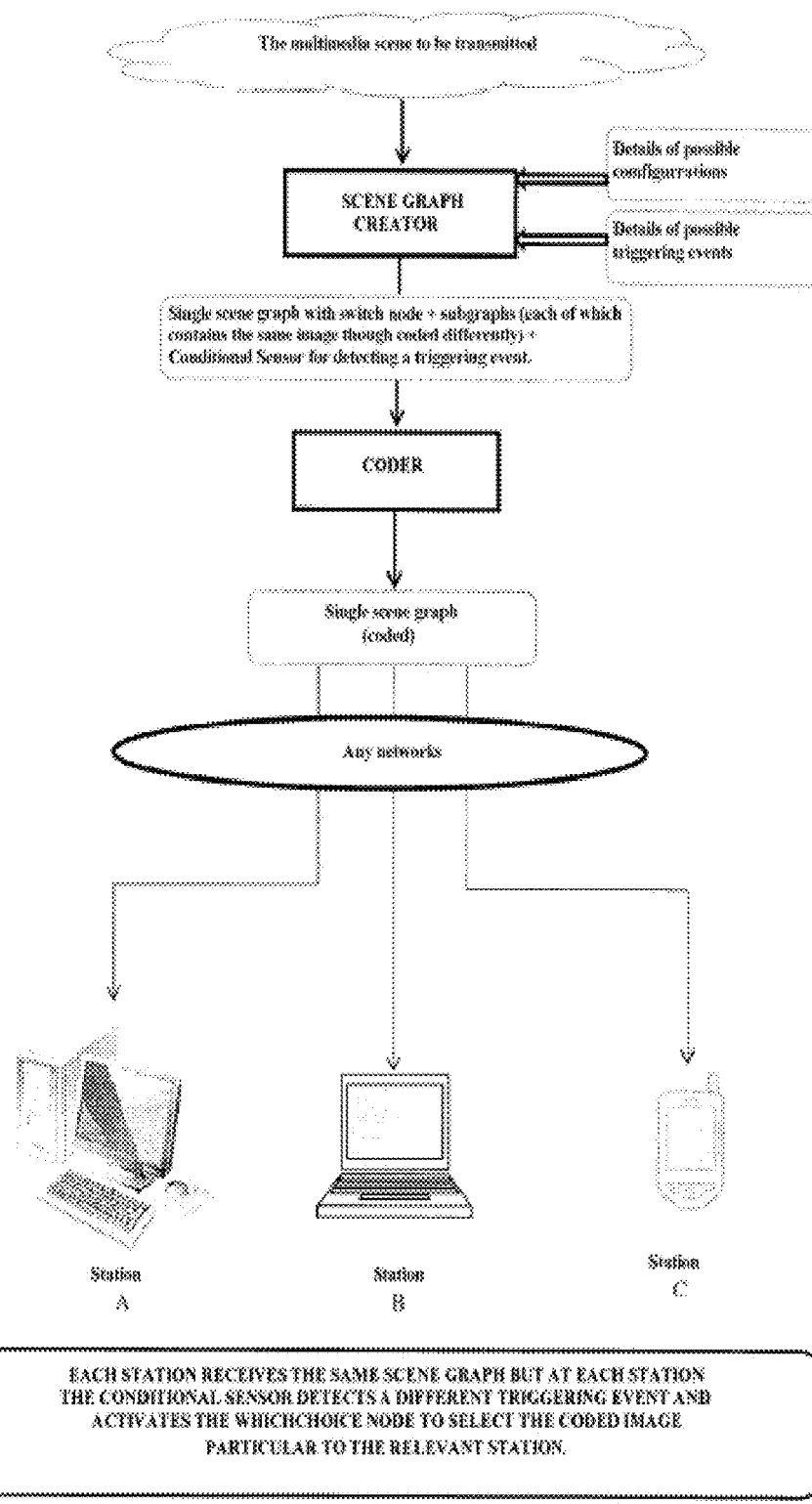
FIGURE 3(a) – PRIOR ART

```
OrderedGroup {
    children [
        Transform2D {
            children [
                Switch {
                    whichChoice 0
                    choice [
                        Shape DEF node1 {
                            appearance Appearance {
                                material Material2D {}
                                texture PixelTexture {
                                    image 24 25 3 0x000001 0x001001 0x001001 0x001001
                                        0x001001  0x001001  0x001001  0x001001  0x001001
                                        0x001001...
                                    repeatS TRUE
                                    repeatT TRUE
                                }
                            }
                            geometry Rectangle {
                                size 24 24
                            }
                        }
                        Shape DEF node2 {
                            appearance Appearance {
                                material Material2D {}
                                texture CacheTexture {
                                    objectTypeIndication 0x6c
                                    image 0x000011 0x011001 0x001011 0x001001 0x011001
                                        0x001001 1x001001 0x011101 0x001001 0x101001...
                                }
                            }
                            geometry Rectangle {
                                size 24 24
                            }
                        }
                        Shape DEF node3 {
                            appearance Appearance {
                                material Material2D {}
                                texture CacheTexture {
                                    objectTypeIndication 0x6d
                                    image 0x001001 0x001101 0x001101 0x001001 0x011001
                                        0x001001 0x001001 0x011001 0x001011 0x101001...
                                }
                            }
                            geometry Rectangle {
                                size 24 24
                            }
                        }
                    ]
                }
            ]
        }
    ]
}
```

- Image in RAW format, adapted to a thin mobile client connected via a good connection to the network (wifi, for example)

- Image in JPEG format, adapted to a thin mobile client connected via an inferior connection (3G / edge, for example)

- Image in PNG format, adapted to the case according to which a compromise has to be made between the resources of the central processing unit (CPU) and those of the network

FIGURE 3(b) – PRIOR ART

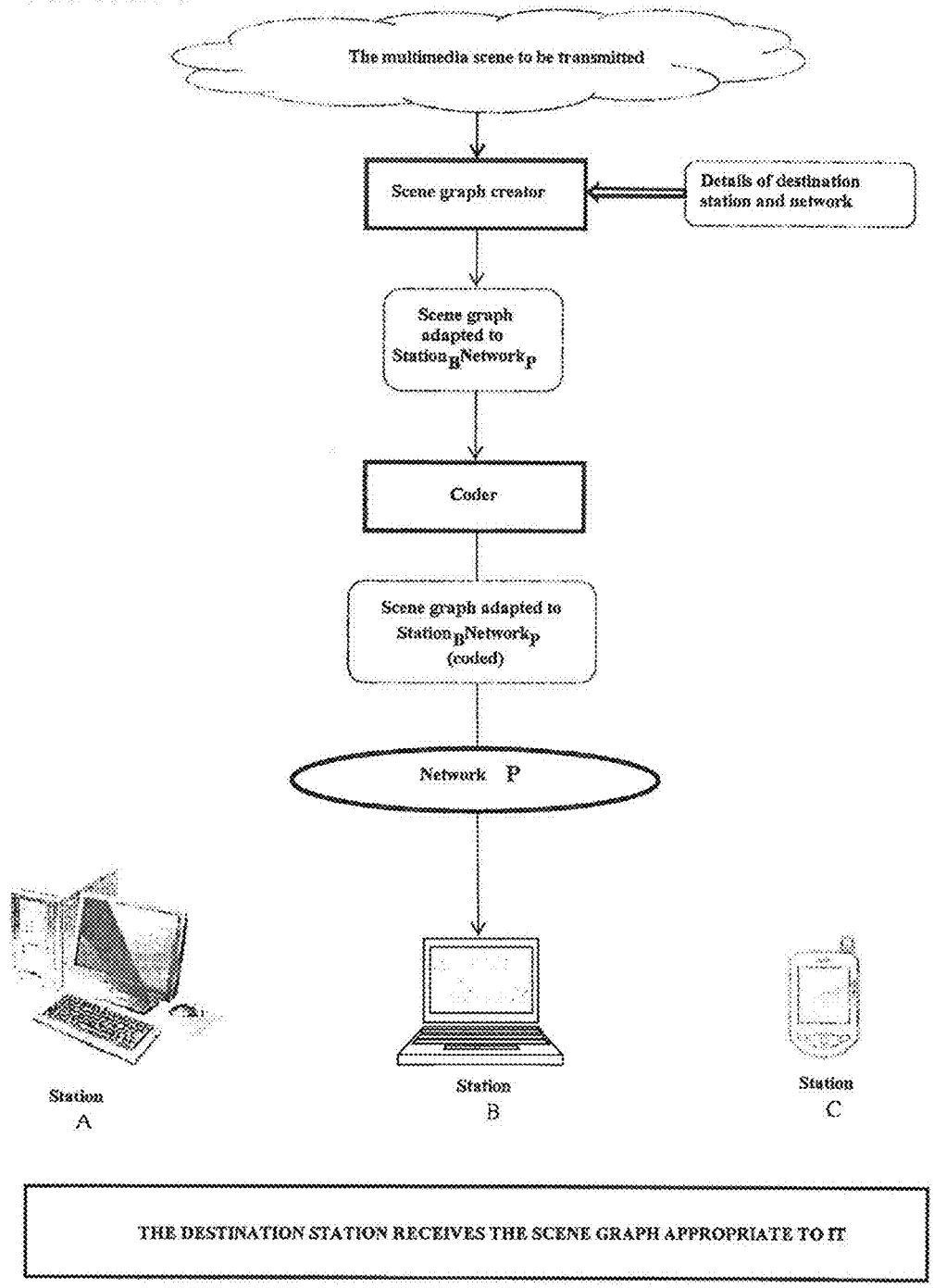

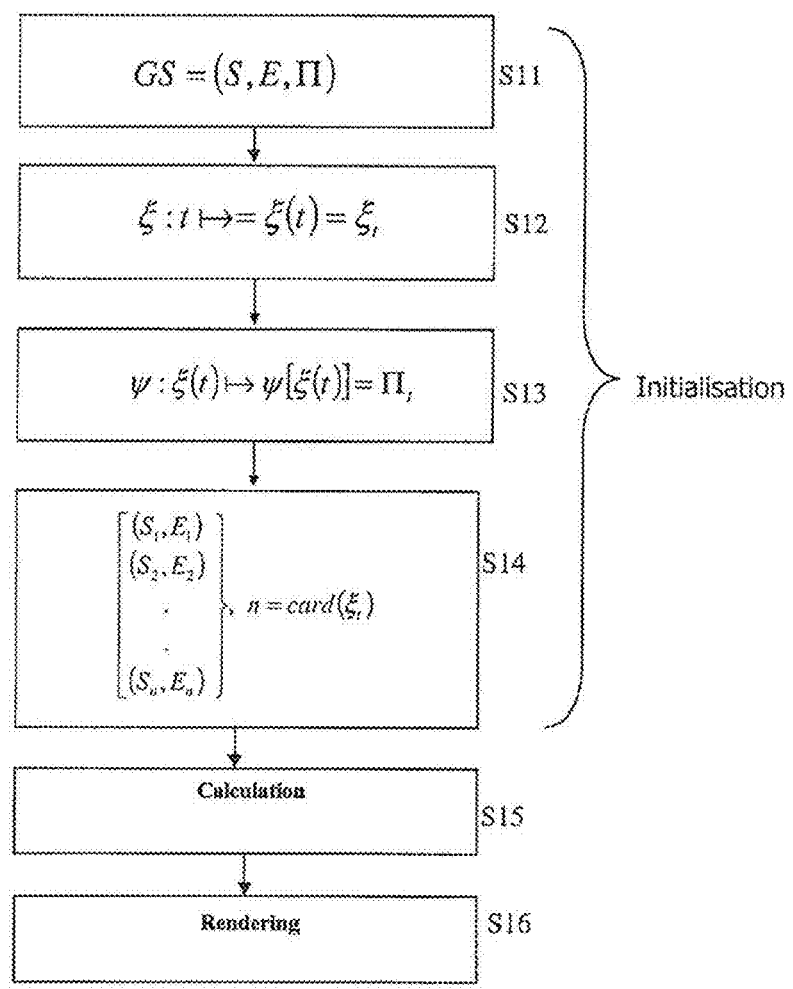

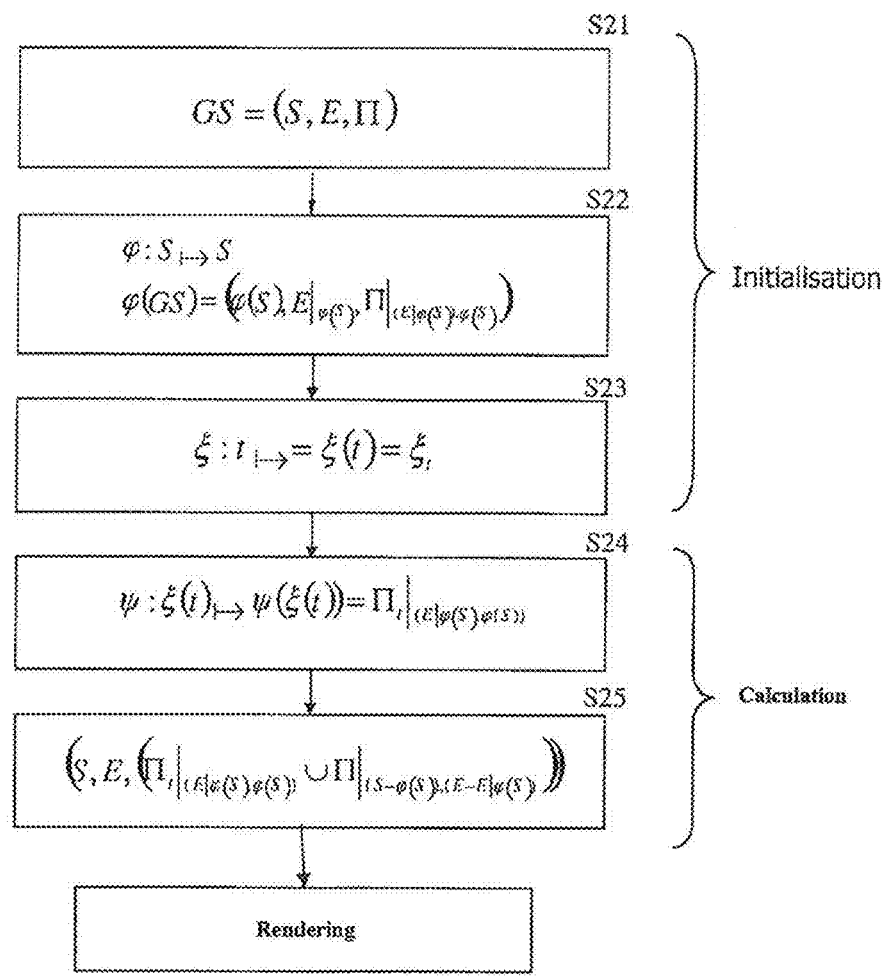

FIGURE 9

```
OrderedGroup {
  children [
    Transform2D {
      children [
        AdaptivityControl {
          strategies [
            ImageCompressionStrategy {
              compressionType ["png" "auto"...]
              compressionParams ["level=9" ""...]
            }
          ]
          node Shape {
            appearance Appearance {
              material Material2D {}
              texture PixelTexture {
                image 24 24 3 0x000001 0x001001...
                repeatS TRUE
                repeatT TRUE
              }
            }
            geometry Rectangle {
              size 24 24
            }
          }
        }
      ]
    }
  ]
}
```

```
<g id="example" style="none">
    <AdaptivityControl strategy="ImageCompression; type:
    auto, png, jpeg; png-level:9,5; jpeg-quality:75">
        <image x="0" y="0" width="190" height="80"
        xlink:href="..."></image>
    </AdaptivityControl>
</g>
```

METHODS AND DEVICES FOR PRODUCING AND PROCESSING REPRESENTATIONS OF MULTIMEDIA SCENES

CROSS-REFERENCE TO RELATED APPLICATIONS

This application is a U.S. National Stage application of International Application No. PCT/FR2012/050849 filed 18 Apr. 2012, which claims priority to French patent application no. 1153387 filed 19 Apr. 2011, the entire disclosures of which are hereby incorporated herein by reference in their entireties.

The invention relates to the field of multimedia content processing, and more particularly to the processing of multimedia scenes.

In the context of the invention, the name multimedia scene will be used for a set of elements, most often heterogeneous, selected for example from text, graphics (vectorial or not), audio sequences (natural or synthesized), images, video sequences, static or animated 3D objects. A multimedia scene can also contain any other type of information intended to influence (modify, interact with . . . ) its elements or elements of the outside world (temperature, sensory feedback—haptic, olfactory . . . ) or elements linked to the user, his devices and environments.

The invention focuses more particularly on a method and device producing multimedia scene representations, and a method and device for processing these representations.

In various contexts, it is desired to transmit a multimedia scene to remote equipment: providing access to a web page, access to a virtual collaborative universe (social network, . . . ), online game, remote use of a computer application, etc.

Conventionally, providing multimedia data to remote equipment consists of transforming the multimedia scene into a sequence of images and associated sounds and coding these images and these sounds for their transmission using processes developed for the transmission of such data.

Various protocols, formats and languages have been proposed to enable the production of a representation of a multimedia scene, this representation describing the spatial and temporal positioning of the different elements of the scene and the behaviour of these elements in different circumstances (for example, the management of changes following user action, management of animations, etc.).

As is known, the multimedia scene can be reconstructed by the receiver from its initial representation and updated (synchronously or not) on receipt of additional data or by execution of procedures included in the representation itself.

It should be noted that even if scene representations are often used for the purposes of transmission of multimedia scenes to remote equipment, notably via a network, they can be used for other purposes.

A scene representation consists of a graph having nodes (or vertices) and relationships between these nodes, each of these nodes defining an aspect of the multimedia scene (object of the scene, texture, behaviour of an object during a particular event, etc.). This graph is called a scene graph.

Some formats and languages propose representing a multimedia scene in the form of a hierarchical graph without cycles (tree) currently called variously «scene tree structure» or «scene graph».

Some scene representation technologies that are already known are MPEG-4 BiFS (from "Binary Format for Scenes" in English) defined in the standard 14496-11 of the International Electrotechnical Commission (CEI in French, or IEC in English) and of the International Standards Organisation (OIN in French, or ISO in English), MPEG-4 LASeR (from "Lightweight Application Scene Representation" in English) defined in the standard 14496-20 of the IEC, VRML (from the English "Virtual Reality Modeling Language") defined by the World Wide Web Consortium, X3D (a successor format to VRML), or else SVG (from the English "Scalable Vector Graphics"), a format defined by the World Wide Web Consortium.

It is usual to apply one or more types of processing (for example compression, encrypting, enriching . . . ) to a scene representation prior to its use (storage, transmission, display, etc.).

Often, the scene representation data is then converted, notably into a binary form enabling coding using a reduced number of bytes. According to some systems, the scene representation data is aggregated with video and/or audio data streams, such as for example according to the SAF protocol (from the English "Simple Aggregation Format") which associates audiovisual streams with a LASeR scene representation. The data transport can be performed in various ways, as per the intended application. This implies, for example, appropriate packetizing of the data to enable for example (1) its transport, in the form of an MPEG-2 (or other) transport stream and/or (2) the use of communication protocols such as RTP/RTSP, etc. The invention is not limited with regard to the treatments applied to the scene representation.

Also, various mechanisms can be utilised to supply the data of the scene representation to the client, for example: progressive downloading, the so-called «download-and-play» system, continuous transmission («streaming»), broadcasting.

The invention also is not limited with regard to the delivery mechanism.

The invention can be also employed for applications in which the scene representation is produced and rendered by the same device, or for applications in which the representation data is not transmitted over a network.

Some scene representation technologies exploit the nature of the heterogeneous content contained in the multimedia scene notably to enable processing that is adapted to the nature or the type of the content in question. An example here is the BiFS standard which defines different coding processes according to the nature of the content of the multimedia scene.

According to the current state of the art, the coding model is predefined and static. FIG. 1 is a diagram which represents a system for creation and distribution of scene graphs employing this static coding model.

This type of static and predefined coding processing model is perfectly effective when the multimedia scene is designed to be processed by equipment whose performance in terms of hardware is known and identical, or at the very least is of the same order. It is therefore necessary to take into account the capabilities of the hardware that is the destination of the data (the size of the memory, the speed of the processor, etc.) as well as the properties of the transmission channel of the data (network rate, etc.).

For example, if the destination hardware of the data is a thin client having hardware of modest capabilities, for example a mobile telephone, and/or if the transmission channel of this data only has limited bandwidth, the scene representation data should be strongly compressed and a coding process should be provided which enables relatively low-complexity decoding at the client.

However, if the destination hardware of the data is an office computer having a high-quality processor connected to the data source via a broadband network, the scene representation data should be adapted so as to allow rendering of the scene in high definition at the destination hardware.

The need to adapt the data of the scene representation to the capabilities of the destination hardware of the data gives rise to problems, especially in the case of a scene representation data server serving heterogeneous clients via heterogeneous networks, this case in point occurring especially in the context of collaborative work.

Current use of BiFS technology responds to this problem by taking into account all possible configurations (which therefore must be known when the scene is created). A first approach consists of producing different versions of the scene representation, intended respectively for terminals and networks of different capabilities. For example, if the multimedia scene comprises a high-resolution image, current use of the BiFS standard provides for the creation of a first scene representation with the high-definition image, this first representation being destined for a high-performance terminal, and a second scene representation with the image at reduced resolution, this second representation being destined for equipment having limited capabilities.

According to this first approach, either all the scene graphs are transmitted and the different terminals make a selection of the scene graph they should process (see FIG. 2(a)) or a selector/directing device is provided at the coder, or downstream of the latter, to route to each terminal the scene graph which is appropriate for it (see FIG. 2(b)). Of course, this first approach multiplies the versions of the scene graph which must be produced by the scene graph creator and, according to the example of FIG. 2(a), increases the footprint of the broadcasting networks.

A second approach could be designed according to which for example the BiFS «switch» node and the «whichChoice» parameter of the latter would be used, utilised jointly with the «Conditional» nodes, and in the same scene representation there would be included the high-resolution image (in a first sub-graph) and the reduced-resolution image (in a second sub-graph). The client will receive the scene representation with its two different sub-graphs and, as a function of a parameter, will choose to display either the high-resolution image or the reduced-resolution image.

FIG. 3(a) illustrates a system for creation and distribution of scene graphs according to this second approach. FIG. 3(b) shows an example of a switch node according to the second approach mentioned hereinabove, and illustrates three sub-graphs, each corresponding to a different version of the same image. The scene graph comprising this switch node would be sent to each user terminal, which involves transmission to each terminal of the three versions of the image. Such an approach pointlessly increases the footprint of the network and the time taken for receiving the scene graph.

Such approaches for adapting a scene to various terminals/networks involves creation of a scene graph (or, at least, a sub-graph) for each configuration that is considered, which is costly in terms of time and use of the processor and memory. Thus, for example, to transmit a scene having high-definition video and finely textured 3D content, to 3 terminals having different resources (for example workstation, laptop, mobile telephone), it is necessary to create three different scene representations (or, at least, sub-graphs) to ensure the same functionality over the three terminals. This same scene transmitted to two workstations via a broadband network and a low-bandwidth mobile network must again be represented by two different scene graphs (or sub-graphs): even though the terminal receives the scene in its entirety (that is, with all possible graphs/sub-graphs), only that part (graph or sub-graph) concerning its specific configuration is displayed.

It is evident that this solution, based on the replication/multiplication of some graphs or sub-graphs for each terminal/network configuration that is a priori possible, is not perfectly satisfactory when the properties of the transmission network are unstable and too different from those of the network of origin, or when the number of these various configurations is too high.

A third possible approach would consist of creating a made-to-measure scene graph, that is, create the scene graph as a function of the properties of the destination terminal and network (see FIG. 4). Now, when the aim is to transmit the same scene to several terminals having different properties and it is planned to distribute the scene graphs via different networks, the scene graph creator must be controlled so as to create as many scene graphs as intended terminal/network combinations. Also, if the aim is to adapt the scene graph to the properties of the transmission channel then a new scene graph has to be created each time the properties of this transmission channel change. Once again this means increasing the workload of the scene graph creator. Also, according to this third approach, latency (wait time before the scene graph is provided) increases.

The problems mentioned hereinabove also arise during use of scene representation technologies other than BiFS, that is, LASeR, VRML, SVG, and others.

The invention provides methods and apparatus for producing and processing a single enriched scene representation, independent relative to its individual parameters of use, which avoids the disadvantages mentioned hereinabove.

In particular, the invention provides a method of producing an enriched multimedia scene representation, this method comprising a step of processing data of said scene to for producing a scene graph representing said scene, this process being characterised in that it comprises:
  an identification step of identifying at least one scene element destined to undergo a coding process capable of varying as a function of at least one parameter,
  a step during which data identifying a sub-graph of said graph are added to said scene graph, said sub-graph corresponding to said at least one scene element, and
  a step during which strategy data is added to said graph, defining at least one variable coding strategy of the sub-graph identified by the identification data, said at least one strategy defining how said variable coding process varies as a function of said parameter.

Unlike solutions evident to the skilled person, the strategies specified in an enriched scene representation according to the invention are, during creation of the scene, independent relative to the specific configurations of use, the latter only becoming relevant later, for example during coding and transmission of the scene; also, these strategies do not result in multiplication of some sub-graphs in order to offer additional alternative content for each configuration.

It can be considered that, according to the invention, a generic scene graph is created and the function of adapting this generic scene graph to a particular configuration (terminal/network) is deferred to a stage downstream of the scene graph creator.

The present invention also provides a device producing a multimedia scene representation, comprising a unit for processing data of said scene capable of producing a scene graph representing said scene, this device being characterised in that it comprises:

identification means capable of identifying at least one scene element destined to undergo a coding process capable of varying as a function of at least one parameter, grouping means capable of adding, to said graph, identification data of a sub-graph of said graph, this sub-graph corresponding to said at least one scene element, and second grouping means capable of adding, to said graph, strategy data defining at least one variable coding strategy of said sub-graph identified by the identification data, said at least one strategy defining how said variable coding process varies as a function of said parameter.

According to the invention a scene graph is associated with data which identifies a sub-graph (which can, if needed, correspond to the entire graph) that is susceptible to undergo at least one variable coding process as a function of at least one parameter (such as, for example, the effective bandwidth of the network or the display device of the user). A single enriched scene representation can therefore be shared effectively between clients having different capabilities, and/or by transmission paths having different resources. For example, in the event where the aim is to transmit a multimedia scene to several clients whose capabilities in terms of hardware are different, and/or else which are connected via different networks, the enriched scene representation identifies the elements which could undergo different processing treatments (for example to take into account the capabilities of destination devices). Nevertheless, the invention is delimited relative to the second approach mentioned hereinabove by the fact that it keeps substantially the same structure and complexity for the scene graph and does not require multiplication of some sub-graphs to be able to offer the same functionality in different configurations.

Advantageously the identification data serving to identify said sub-graph and/or the data defining each variable coding strategy constitute respective nodes of the scene graph. In this way, the enriched representation data according to the invention can be processed even by conventional receiver devices.

Advantageously, the invention is also characterised in that the variable coding process susceptible of being applied to said sub-graph consists of processing that is dependent on the properties of a data transmission channel and/or of equipment that will reconstitute the multimedia scene and/or of the profile of its user.

Advantageously, the invention is also characterised in that the information necessary for executing the variable coding process of said sub-graph is embedded in the graph representing the scene.

The invention also provides a method of processing a representation of a multimedia scene represented by a scene graph, this process comprising:

an identification step of identifying a sub-graph of said graph from identification data extracted from said scene representation, said sub-graph corresponding to at least one scene element susceptible of undergoing a coding process that is susceptible of varying as a function of at least one parameter;

a step for determination of the value of said at least one parameter; and a coding step of said sub-graph by application of at least one coding process taking into account the value of said parameter.

Unlike existing solutions, the coding step is not designed for a simple selection from the final set of possible choices pre-established during creation of the scene, but comprises a calculation dimension via which the general representation is instantiated according to the specific work configuration.

The invention also relates to a device for processing a representation of a multimedia scene represented by a scene graph, this processing device comprising:

identification means of a sub-graph of said graph, from identification data extracted from said scene representation, said sub-graph corresponding to at least one scene element susceptible of undergoing a coding process susceptible of varying as a function of at least one parameter;

means for determining the value of said at least one parameter; and coding means of said sub-graph by application of at least one coding process taking into account the value of said parameter.

The method and the processing device mentioned hereinabove can execute rendering of the multimedia scene in conformity with its enriched scene representation.

The advantages and the characteristics indicated hereinabove, as well as others, will emerge more clearly from the following description of some embodiments of the invention, given by way of illustrative though non-limiting examples, and illustrated in reference to the attached diagrams, in which:

FIG. 1 illustrates an example of a system using a static coding model;

FIG. 2 illustrates examples of systems for creation and distribution of scene graphs according to coding models which take into account all possible configurations (terminals/networks), in which:

FIG. 2(a) illustrates a system according to which each user terminal elects the scene graph appropriate to itself, and FIG. 2(b) illustrates a system according to which the scene graph appropriate to the client is selected prior to transmission;

FIG. 3 illustrates an example of use of a switch node, according to the second approach mentioned hereinabove, to enable adaptation of a scene to the capabilities of its destination terminal, in which:

FIG. 3(a) illustrates a system employing the node Switch, and

FIG. 3(b) illustrates an example of the node Switch, this example being expressed in BT format (a text format of BiFS);

FIG. 4 illustrates an example of a system for creation and distribution of scene graphs according to a coding model as per the third approach mentioned hereinabove;

FIG. 5 illustrates, in the form of a flow diagram, the main steps of a known process (for example, based on the node «switch») for production of scene representation data adapted to different constraints imposed by the environment (for example the properties of the transmission path);

FIG. 6 illustrates, in the form of a flow diagram, the main steps of a process for production of a representation of a multimedia scene in keeping with a particular embodiment of the invention and the main steps of a process for processing a representation of a multimedia scene in keeping with a particular embodiment of the invention;

FIG. 9 illustrates an example of use of the invention in the context of the embodiment of FIG. 7, this example being expressed in BT format and taking advantage of the use of new node types «AdaptivityControl» and «ImageCompressionStrategy»;

Figure 7:
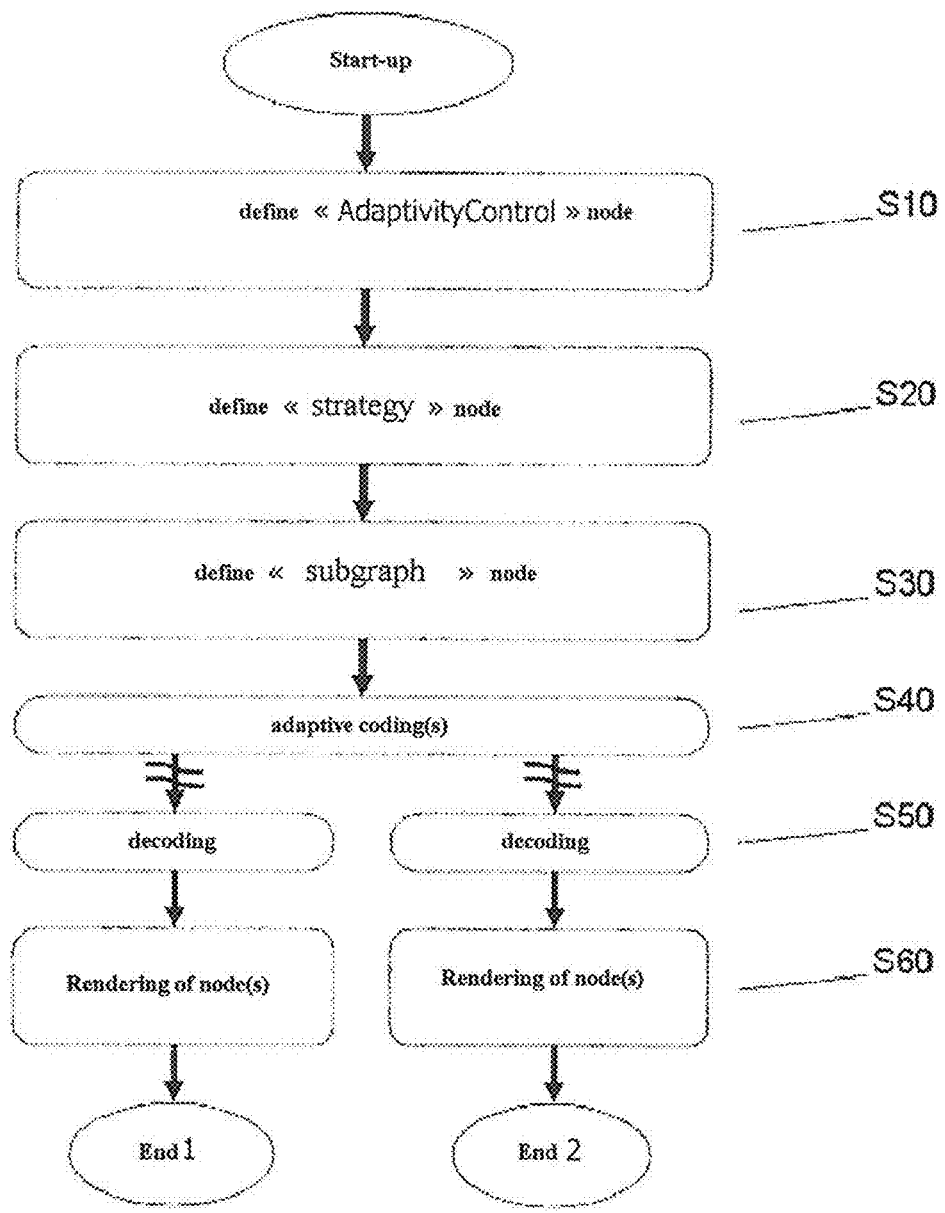
FIG. 7 illustrates, in the form of a flow diagram, the main steps of processes for production and processing of multimedia scene representations in a particular embodiment of the invention comprising an extension of the BiFS standard.

Before some embodiments of the invention are described, it is appropriate to present the theoretical bases of the invention, especially by explaining how the steps of a process according to the invention differ from the steps of a known process according to which scene representation data are produced to take into account a certain number of constraints.

First of all, the steps of a known process will be explained in relation to the flow diagram of FIG. 5.

Step S11: known techniques are applied to process a multimedia scene to produce a scene graph (GS), comprising a set of nodes (S) and relations (E) which associate the nodes to each other, these relations involving some parameters (Π).

Step S12: when the aim is to be able to adapt the processing in dependence on the capabilities of the data's destination device (or, more generally, as a function of any constraint originating from the environment or even from other components of the scene), it is appropriate to consider a space defined by all the possible constraints which will be applied to the scene graph. According to the first and second approaches mentioned hereinabove, the space of these constraints must be known a priori. Even though the constraints originating from the environment are defined in the form of functions $\xi(t)$ dependent on time, they are found at the creation of the scene via their specific instantiations. In practice (real application), these constraints can be linked to different factors, such as for example the bandwidth of the network to ensure adaptive compression or the profile of the user during the installation of a multimedia companion for handicapped people.

Step S13: So that the constraints can be applied to the graph, the scene parameters are fixed, at the scene production device, as a function of some strategies. Referring again to the earlier examples, these strategies can refer to selection of a certain compression algorithm (such as png or jpg) or to cancellation of the audio component for the hard of hearing. Encrypting by unique keys for each user, parental control, etc. can also be considered here. All the possible values of the functions $\psi(\xi(t))$ should be considered.

Step S14: To be prepared for any configuration that is susceptible to occur, it is necessary to create as many scene graphs $((S_1,E_1), (S_2,E_2), \ldots)$ (or sub-graphs) as possible configurations in the constraint space. According to the application, the notion of constraint space covers different realities. For example, in a compression application, this space comprises all possible combinations between the bandwidths of the networks via which the content can be transmitted, the terminals on which the content can be rendered and the types of content which various users are authorised to access.

Step S15: According to the constraints which apply in practice (for example the value of the bandwidth of the transmission path utilised to transmit the scene representation data, once coded, or the properties of the restoration device), the scene graph which best corresponds to these constraints is selected, this choice being made either at the client terminal (FIG. 2(a)) or prior to transmission of the data (FIG. 2(b)). This corresponds to the measurement of the current value of the $\xi(t_i)$ and the selection of the corresponding data-pair $(S_i, E_i)$.

Step S16: the scene is restored by the restoration device based on the received adapted scene graph $(S_i, E_i)$.

The steps of the processes for production and processing according to the invention will now be explained in an example in relation to the flow diagram of FIG. 6.

Step S21: known techniques are applied to process a multimedia scene to produce an initial scene graph (GSI), as in step S11.

Step S22: the elements of the scene which could be subjected to variable processing (for example for reasons of adaptation to constraints) and those which should undergo fixed processing are identified. For example, when the aim is to process a www page of YouTube type, often it is desired to use a single type of coding in relation to the text which forms part of a multimedia scene without considering the properties of the transmission path and/or the scene destination device, whereas variable treatment in relation to images/video in the scene makes it possible to produce images/video of the best possible resolution at the time of rendering. Still by way of example, if rendering on a thin terminal (mobile telephone) is now considered the tools for haptic navigation can be deactivated, whereas the use thereof on an intelligent terminal significantly increases the comfort of the user. The element (or the elements) that it is desired to be able to subject to variable treatment is (are) selected. This corresponds to the selection of a sub-graph of the scene graph.

The scene sub-graph is defined in the form of a function $\varphi: S \mapsto S$ which identifies a subset of S, the restriction of E to this subset, as well as the subset of parameters $\Pi|_{(E|\varphi(S)),\varphi(S)}$ of the initial set $\Pi$. This is therefore a unitary and general representation, independent of the various specific configurations which can be found during processing of the scene.

It should be remembered that a sub-graph can correspond to the whole of the initial scene graph.

Step S23: The space of all possible constraints is considered. The constraints are defined in the form of functions $\xi(t)$ of time. According to the invention, at the time of creation of the scene this step does not require knowledge of the specific processing conditions.

Steps S24 and S25: To apply the constraints to the sub-graph, some functions are used to modify the parameters of the scene, these functions mathematically describing the modification strategies. This calculation step can be implemented by the scene production apparatus, by the equipment transmitting the scene, by the equipment receiving the scene or else by network equipment (more generally somewhere between production of the enriched scene representation and rendering of the latter), according to the specific application. The functions $\psi[\xi(t)]$ are calculated, as well as the corresponding adapted scene graph.

Step S26: The multimedia scene is restored at the receiver equipment based on the adapted scene graph.

In relation to FIGS. 7, 8, 9 and 11, an embodiment of the invention will now be described according to which an extension of BiFS is made to define two new types of node which will serve for enrichment of the scene representation. A new type of node, which will be called «AdaptivityControl» (that is «adaptivity control»), identifies the sub-graph susceptible of being subjected to variable (adaptation, dynamic) processing. The second new type of node, here designated by «StrategyNode» (that is, «strategy node») defines the details of the (variable) processing to be undertaken. It should be noted that adaptation of this embodiment to protocols/formats/languages other than BiFS falls within the scope of the capabilities of the skilled person, as shown for example by the adaptation to LASeR format illustrated in FIG. 10.

According to the present embodiment, a node of «AdaptivityControl» type is itself the parent of the selected sub-graph and it contains an ordered list of nodes which give the strategies for the variable treatment.

The list of strategies can be updated by modification, addition or deletion, in a dynamic manner, by employing conventional scene updates. Each strategy has its own node; the logic of the strategy is determined by the type of the node. The fields of each of these nodes give the parameters of the variable processing.

When an «AdaptivityControl» node is processed by a coder, its strategies are applied to the relevant sub-graph recursively. A decoder of a thin terminal can take into account the existence of an «AdaptivityControl» node to process the content of the scene adaptively.

As an example of a possible strategy one can cite adaptive processing which serves to compress an image. The corresponding node will be called «ImageCompressionStrategy»; it serves to provide a list of preferred compression types in relation to compression parameters specific to each of these types. Among the types of compression, an «auto» type can be defined which serves to code an image adaptively by performing compression adapted for each of the clients. The group of permitted types can be expanded.

It is possible to define other strategies, for example strategies associated with specific types of content (video, 3D, sound) or strategies associated with complex treatments. Apart from the examples already cited (encryption, parental control, haptic control and navigation, multimedia companion for handicapped people), modifications caused in the scene as a function of various environmental conditions of the terminal, such as average luminosity, temperature or its orientation, can also be mentioned here.

The use of these new types of node to enrich a scene adds to the processing phase a degree of flexibility that has been unknown to date.

Because of this flexibility, advantages (in terms of transmission, sharing and reuse of multimedia content) are obtained relative to current techniques, such as:

adaptive coding of a single tree structure for different clients, as a function of the capabilities (hardware/software) of the client and/or as a function of the profile of the client and/or as a function of the properties of the link serving for transmission of the data to the client;

a single decompression of compressed data (for example, images) is enough during reuse on the receiver side;

management of the scene is simplified because when multiple codings are necessary multiplication of the nodes is avoided;

there is just one control point for executing updating of a complex scene;

the processing parameters can be updated dynamically; and this increased flexibility is achieved without increasing the complexity at the client side.

The flow diagram of FIG. 7 comprises the following steps showing how the invention can be exploited in relation to a scene;

S10: creation of a new «AdaptivityControl» node and placing the latter in the scene graph;

S20: creation of at least one strategy node according to the behaviour that it is desired to obtain during processing, this node being specified as a strategy relating to the «AdaptivityControl» node;

S30: creation of the sub-graph which should be processed according to the strategies, and placement of the sub-graph as child of the «AdaptivityControl» node;

S40: the sub-graph is processed by an adaptive coding as per the strategies forming part of the list of strategies. The adaptive processing can code a simple node appropriately as a function of the capabilities of the client, of the current state of the network and/or as a function of any other constraint relevant to the application (type of subscription, state of battery consumption, user profile, etc);

S50: the content is subjected to a decoding process complementary to the applied coding, and the corresponding sub-graph is produced;

S60: the rendering of the sub-graph is performed and the corresponding displaying occurs in association with reproduction of any appropriate audio.

Figure 8:
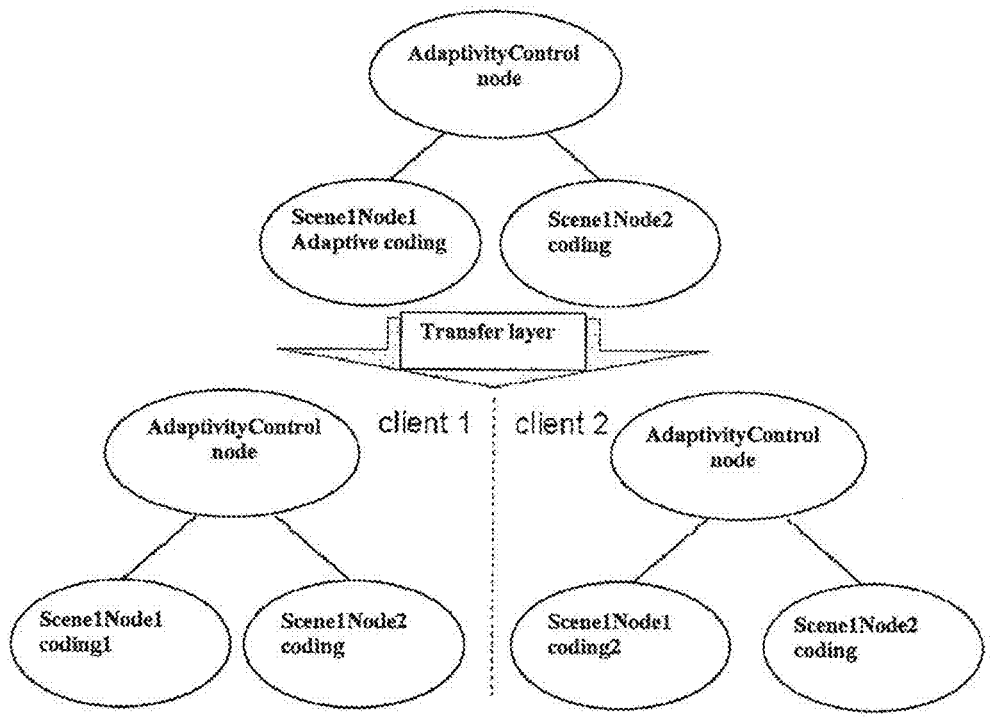
FIG. 8 is a diagram serving to illustrate a scene tree structure shared by two devices, before and after application of adaptive processing at the node 1 according to the embodiment of FIG. 7.

An example of adaptive processing of a scene according to a strategy is explained in relation to FIG. 8. In this example two nodes are processed differently. The processing of Node1 (which corresponds, for example, to a high-resolution image) depends on the strategy defined in relation to the «AdaptivityControl» node: in this example Client 1 and Client 2 will receive data coded differently as a function of their capabilities. The processing of Node2 (for example a node which comprises text) is not concerned by the strategy and undergoes conventional processing.

The nodes will be described in more detail hereinbelow. The following descriptions are in conformity with the specification of the BiFS standard. The skilled person can immediately derive corresponding descriptions according to other technologies.

AdaptivityControl

This node is represented in annex 1; it corresponds to an example of a way of specifying and identifying the parts of a scene (node, sub-graph, graph) which are intended to be subjected to adaptive processing, and a way of indicating the strategies which will be applied to perform processing of these parts. The first of these functions is performed by the Node («node») field of SFNode type, whereas the second is performed by the Strategies («strategies») field of MFNode type.

The Node («node») field comprises the upper node of the sub-graph which will be treated adaptively. The Strategies («strategies») field contains a list of all the strategy nodes that should be applied to the sub-graph. The addStrategy («add strategy») and removeStrategy («remove strategy») fields, of MFNode type, are employed to add nodes to the list of strategies and to remove them employing known methods used during grouping of nodes such as Group or OrderedGroup.

ImageCompressionStrategy

This type of node is represented in annex 2; it describes the parameters of a specific example of strategy employed to effect adaptive processing (that is, transmission of compressed images), and is to be inserted into a list of strategies of an «AdaptivityControl» node (or other node of this kind).

This particular strategy modifies the way in which the images are coded by specifying a list of possible compression types along with their associated parameters.

The «compressionType» field is a list of chains of data. Each element is a possible compression strategy which could be used for coding the (image) content of part of the scene. The content by default of this list is «auto»: in this way the coder can select a type of appropriate compression as a function of the constraints measured at a certain moment.

In relation to each type of compression an element of the list «compressionParams» is defined; it contains the list of possible parameters which will be employed in relation to this type of particular compression. The «auto» type has no need of parameters.

Example of Use

From the multimedia viewpoint, FIG. 9 illustrates a way of integrating the two types of nodes into BiFS to achieve adaptive coding of image-type content in a particular PixelTexture node.

After the creation of an «AdaptivityControl» node, there follows a conventional hierarchy of nodes («Shape», «Appearance», «Material2D», «PixelTexture» nodes) necessary for placing an image on the scene. A new «ImagecompressionStrategy» node is created in the list of strategies of the «AdaptivityControl» node. The «PixelTexture» node, as an element of the sub-graph controlled by the «AdaptivityControl» node, is affected by the strategy that is applied for compression processing of image data.

From the functional viewpoint, three mechanisms implement the dynamic adaptive coding. First, the same scene content should be perceived by two different clients which have different computer/display resources, the node being processed differently/adaptively in relation to each user. Second, the computer/display resources of the same user can vary over time (for example a second application is launched on this client, reducing the available resources of the processor). Finally, it is probable that modifications of conditions applying to the network will take place during perception of the content by the user. These three mechanisms will be converted into a set of parameters controlling the adaptation.

As can be seen from FIG. 9, relative to the solution illustrated in FIG. 3(b) the invention enables a scene to be made consistent with the various terminals/networks without substantial change to the structure or complexity of the scene graph. According to this example it is evident, in particular, that it is not necessary to send each client all the different possible versions of the image.

Even though this example exploits the already-existing «PixelTexture» type of node, the invention can relate to any other BiFS node. Also, as indicated hereinabove, the application of the invention is not limited to the BiFS standard; it can be applied in relation to other standards as well as with non-standard approaches.

Figures 10, 11:
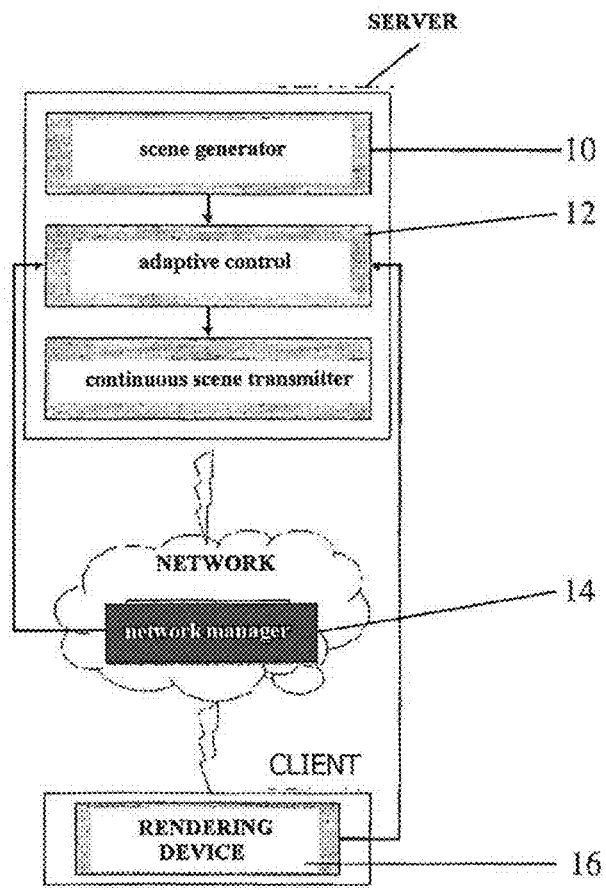
FIG. 10 illustrates another example of the use of the invention in the context of the embodiment of FIG. 7, this example being expressed in SVG format (cf. LASeR standard) and taking advantage of the use of a new type of «AdaptivityControl» node.
FIG. 11 illustrates an embodiment according to which the condition of the adaptivity control changes dynamically as a function of an external factor such as a network manager or the client.

Still by way of illustration, FIG. 10 shows the way in which part of an image can be compressed adaptively and dynamically in LASeR. Within the group identified by the «example» id, the «AdaptivityControl» node is defined. This node contains an «ImageCompression» strategy dedicated to coding of images. Three types of coding are possible: «auto», «png», «jpg». These coding algorithms can be applied with different parameters described by «png-level» or «jpeg-quality». The image which forms the object of this processing is referenced by the image node that already exists in LASeR and which specifies the id of the image (the xlink:href field) as well as the scene coordinates (the «x», «y», «width» and «high» fields) where the image must be rendered.

The rendering on the client side which enables viewing (or interaction with) the representations produced according to the embodiments of the present invention can be of various natures: for example, a plugin in a navigator, specific software for processing representations, a module which forms part of the operating system, a special adaptation of the equipment («hardware»). The invention is not limited relative to the nature of the rendering means.

FIG. 11 schematically shows an embodiment of a system according to the invention in which a server provides data representing a scene to its clients, via a network. According to this embodiment, at the server a scene generator 10 generates a scene representation enriched according to the invention and an adaptive control unit 12 implements the required variable processing as a function of the information received from the client-side rendering device 16, and from a network manager 14. Of course, as indicated hereinabove, the invention is not limited to the case where adaptation is done at the server.

Figure 12:
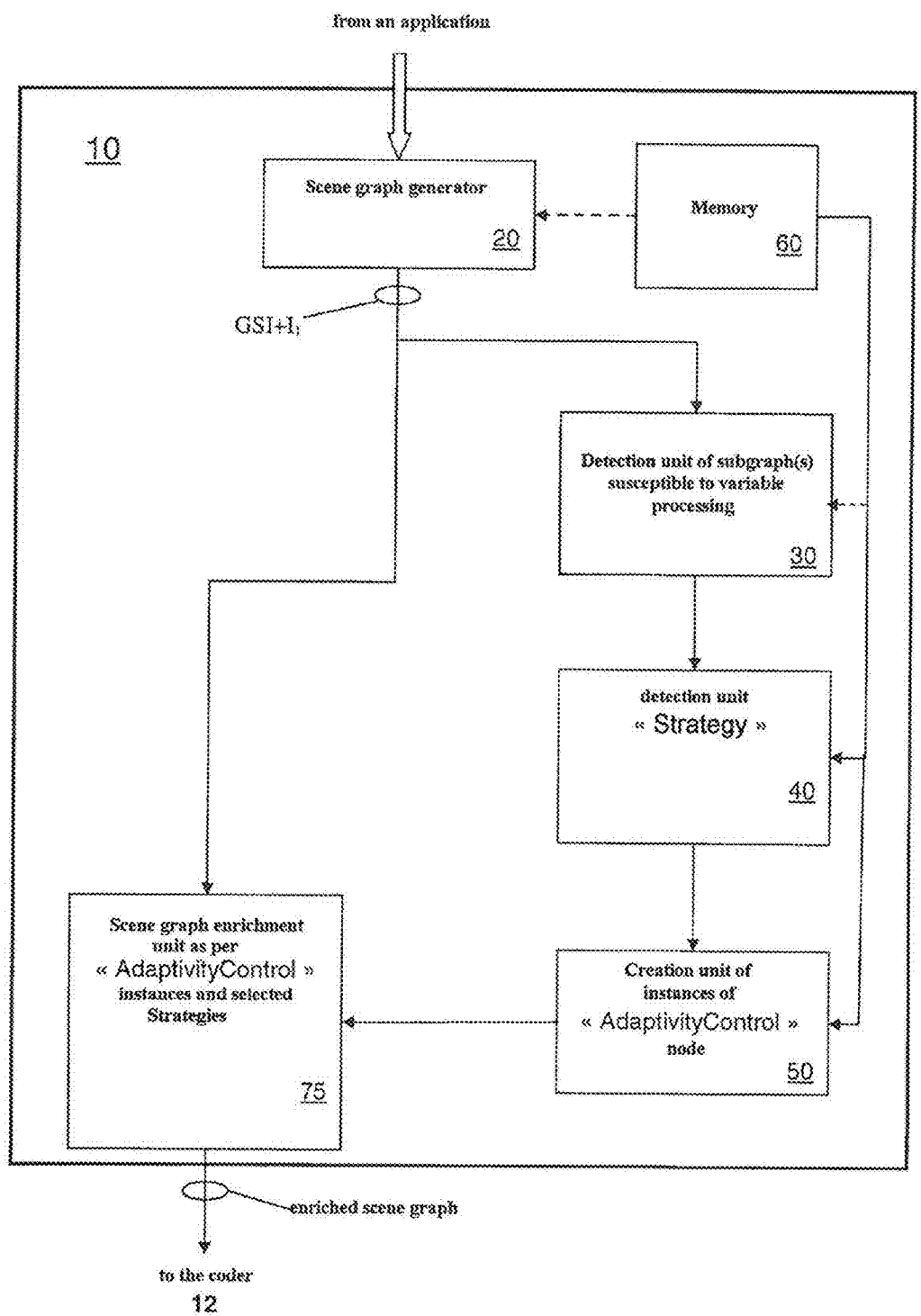
FIG. 12 illustrates schematically the components of a device for creation of an enriched scene graph in keeping with an embodiment of the invention.

FIG. 12 schematically shows an embodiment of the scene generator 10 of FIG. 11.

A scene graph generator module 20 processes the data originating from an application to define an initial scene graph. Various conventional processes are used in this field to define a scene graph to represent data originating from an application and the invention is not particularly limited with regard to the processes which the scene graph generator 20 can employ. However, unlike known scene graph generator devices, the module 20 is configured to detect the parts of the scene graph which could, optionally, undergo variable processing during coding (for example as a function of the profile of a client).

This detection function is based on criteria which often are defined in advance and which depend for example on the choices of the designer. For example, when the aim is to allow coding of video data using a variable number of bits according to the profile of a client, the scene graph generator module 20 applies a rule which serves to detect those parts of the graph (for example, nodes) which correspond to video data streams. Another example relating to performing an encrypting function according to which some data forming part of the scene is encrypted as a function of different keys involves application by the scene graph generator module 20 of a rule which serves to define which data is concerned by this variable encryption.

There are various ways of informing the scene graph generator module 20 of the criteria to be applied during execution of the detection function mentioned hereinabove: for example, the data defining the appropriate criteria can be stored inside this module 20 or stored in a memory 60 which is external to the latter (hence the arrow in dotted lines in FIG. 12), or a dynamic configuration can be provided according to which when the initial scene graph is created the scene graph generator module 20 obtains the criteria necessary for this detection step (for example, from a human or computer controller).

Naturally, a single scene graph can comprise several elements which are susceptible to variable processing treatments and which are recognised by the scene graph generator module 20 by applying different criteria.

The scene graph generator module 20 produces information $I_1$ which serves to identify the parts of the initial scene graph which are susceptible of undergoing variable processing. This information $I_1$ indicates not only the elements of the initial scene graph which can undergo variable processing but also identifies the relevant respective processing (for example, by using predefined identifiers). The format of the information $I_1$ is not particularly limited: there can be provided a single block of data which comprises all the information necessary in relation to the initial scene graph, a respective block of data for each scene element which can undergo variable treatment, or any other suitable format.

The scene graph generator module 20 associates the information $I_1$ with the initial scene graph and the resulting data is output. At the output of the scene graph generator 20, the elements of the initial scene graph which are candidates for transformation are detected by a module 30 based on the information $I_1$, for inputting into a block 40 which makes the link to the strategies which are predefined in relation to the relevant variable processing treatment(s).

There are several ways of providing the block 40 with the details of the strategies which relate to the different provided variable processing treatments: for example, these details can be stored in the memory 60 during a preliminary configuration phase of the device 10, or a dynamic configuration can be provided according to which the block 40 obtains details of the strategies (for example, from a human or computer controller) at the moment of associating the strategies to the elements of the scene graph.

As a function of these strategies, the corresponding nodes of «AdaptivityControl» type are instantiated by a block 50. In fact, the block 50 performs calculations for executing the decisions made by the block 40. The information necessary for operation of this block 50 is obtained in the same way as that necessary for the block 40. The final enriched graph is obtained at the output from a graph-enrichment device 75 which combines the «AdaptivityControl» instances and the selected strategies with the elements of the initial scene graph which will not undergo variable processing. This integration can be done by replacing in the initial scene graph GSI (produced by the module 20) the elements susceptible to variable processing by their adapted versions output from the block 50. This approach ensures backward compatibility with known coding devices and client terminals.

The memory 60 for controlling operations of blocks 30 to 50 (and optionally of block 20) receives its information from the configuration devices (whether manual or automated).

The configuration of the scene generator 10 according to the example described hereinabove corresponds to one of the different possible ways to distribute the functions destined to produce an enriched scene graph in keeping with the invention. The skilled person knows that the abovementioned functions can be carried out by using modules different in number and/or nature to those of FIG. 12. For example, the function of detecting the parts of the scene which correspond to elements which can undergo variable processing, performed by module 20 of FIG. 12, can be accomplished by module 30. In this case, this module must have additional information supplied by the memory 60 (cf. the arrow in dotted lines).

Even though particular embodiments of the present invention have been described hereinabove, the skilled person will understand that various modifications and adaptations can be made to the latter without departing from the scope of the present invention.

| ANNEX 1 | | | |
|---|---|---|---|
| AdaptivityControl { | | | |
| eventIn | MFNode | addStrategy | |
| eventIn | MFNode | removeStrategy | |
| exposedField | MFNode | Strategies | [ ] |
| Field | SFNode | Node | |
| } | | | |

| ANNEX 2 | | | |
|---|---|---|---|
| ImageCompressionStrategy { | | | |
| Field | MFString | compressionType | ["auto"] |
| Field | MFString | compressionParams | [" "] |
| } | | | |

The invention claimed is:

1. A process to produce an enriched representation of a multimedia scene, the multimedia scene being rendered by a terminal, the process comprising:
   a data-processing step to produce a scene graph representing said multimedia scene,
   a detecting step to detect at least one sub-graph, of said scene graph, that is suitable to undergo a subsequent variable coding process that varies as a function of a configuration of use conditions of the scene graph, wherein the configuration of use conditions of the scene graph comprises a set of use conditions selected from the group consisting of:
   at least one attribute of the terminal rendering the multimedia scene, at least one property of a transmission channel that transmits said scene graph to the terminal, and at least one parameter of a user profile of a user of the terminal rendering the multimedia scene, the sub-graph being generic to, but independent of, the different possible configurations of use conditions of the scene graph;
   a step of adding, to said scene graph, identification data of said sub-graph, the identification data being configured to indicate that the sub-graph is configured to subsequently be subjected to adaptation that depends on at least one of the at least one attribute, the at least one property, and the at least one parameter that applies to the scene graph; and
   a step during which strategy data defining at least one variable coding strategy of the sub-graph identified by the identification data is added to said scene graph, said at least one variable coding strategy representing in a unitary manner a plurality of different possible types of coding which are neither known nor listed during the scene creation and specifying how the type of coding to be used in said subsequent variable coding process is to be varied as a function of at least one of the at least one attribute, the at least one property, and the at least one parameter that applies to the scene graph.

2. The process according to claim 1, wherein the identification data of the sub-graph constitutes a first node of the scene graph, and wherein the step of adding comprises:
   creating a second node of a type indicating that a child node thereof is configured to subsequently be subjected to adaptation that depends on at least one of the at least one attribute, the at least one property, and the at least one parameter that applies to the scene graph; and adding said created second node to the scene graph as a parent node of the sub-graph detected in the detecting step.

3. The process according to claim 1, wherein said strategy data constitutes a node of the scene graph.

4. The process according to claim 1, further comprising embedding in said scene graph code necessary for executing the variable coding process.

5. A device for producing an enriched representation of a multimedia scene, the multimedia scene being rendered by a terminal, the device comprising:

a processor configured to:

process data to produce a scene graph representing said multimedia scene, detect at least one sub-graph, of said scene graph, that is suitable to undergo a subsequent variable coding process that varies as a function of a configuration of use conditions of the scene graph, wherein the configuration of use conditions of the scene graph comprises a set of use conditions selected from the group consisting of: at least one attribute of the terminal rendering the multimedia scene, at least one property of a transmission channel that transmits said scene graph to the terminal, and at least one parameter of a user profile of a user of the terminal rendering the multimedia scene, the sub-graph being generic to, but independent of, the different possible configurations of use conditions of the scene graph;

add, to said scene graph, identification data of said sub-graph, the identification data being configured to indicate that the sub-graph is configured to subsequently be subjected to adaptation that depends on at least one of the at least one attribute, the at least one property, and the at least one parameter that applies to the scene graph; and add, to said scene graph, strategy data defining at least one variable coding strategy of the sub-graph identified by the identification data, said at least one variable coding strategy representing in a unitary manner a plurality of different possible types of coding which are neither known nor listed during the scene creation and specifying how the type of coding is to be used in said subsequent variable coding process is to be varied as a function of at least one of the at least one attribute, the at least one property, and the at least one parameter that applies to the scene graph.

6. The device according to claim 5, wherein said processor is configured to create a node of a type indicating that a child node thereof is configured to subsequently be subjected to adaptation that depends on at least one of the at least one attribute, the at least one property, and the at least one parameter that applies to the scene graph, and to introduce the created node into said scene graph as a parent node of the sub-graph detected in the detecting step.

7. The device according to claim 5, wherein said processor is configured to introduce, into said scene graph, a node representative of said strategy data defining at least one variable coding strategy.

8. The device according to claim 5, wherein said processor is configured to embed, in said scene graph, code for executing said variable coding process.

9. A method of adapting a representation of a multimedia scene represented by a scene graph to the conditions of use thereof, the method comprising:

an extraction step of extracting, from said representation, identification data and strategy data associated with a sub-graph of said scene graph, wherein the identification data indicates that the sub-graph is configured to subsequently be subjected to adaptation that depends on at least one condition of use that applies to the scene graph, said at least one condition of use being selected from the group consisting of: at least one attribute of a terminal rendering the multimedia scene, at least one property of a transmission channel that transmits said scene graph to the terminal, and at least one parameter of a user profile of a user of the terminal rendering the multimedia scene, and the strategy data defines at least one variable coding strategy of the sub-graph identified by the identification data, said at least one variable coding strategy representing in an unitary manner a plurality of different possible types of coding and specifying how the type of coding to be used in said subsequent variable coding process is to be varied as a function of at least one of the at least one attribute, the at least one property, and the at least one parameter that applies to the scene graph;

an identification step to identify a sub-graph of said scene graph, from the identification data extracted from said representation, said sub-graph corresponding to at least one scene element destined to undergo a variable coding process that varies as a function of a configuration of use conditions of the scene graph, wherein the configuration of use conditions of the scene graph comprises a set of use conditions selected in the group consisting of: at least one attribute of a terminal rendering the multimedia scene, at least one property of a transmission channel that transmits said scene graph to the terminal, and at least one parameter of a user profile of a user of the terminal rendering the multimedia scene, the sub-graph being generic to, but independent of, the different possible configurations of use conditions of the scene graph;

a step for determining a value of at least one of the at least one attribute, the at least one property, and the at least one parameter that applies to the scene graph; and a coding step of said sub-graph by application of at least one coding process taking into account the value of at least one of the at least one attribute, the at least one property, and the at least one parameter, in accordance with said strategy data.

10. The method according to claim 9, further comprising extracting information necessary for executing said coding step from said scene graph.

11. The method according to claim 9, further comprising: reconstituting said multimedia scene from said scene graph.

12. A device to adapt a representation of a multimedia scene represented by a scene graph to conditions of use thereof, the device comprising a processor configured to:

extract, from said representation, identification data and strategy data associated with a sub-graph of said scene graph, wherein the identification data indicates that the sub-graph is configured to be subjected, at a time of use of the scene graph, to adaptation that depends on at least one condition of use that applies to the scene graph, said at least one condition of use being selected from the group consisting of: at least one attribute of a terminal rendering the multimedia scene, at least one property of a transmission channel that transmits said scene graph to the terminal, and at least one parameter of a user profile of a user of the terminal rendering the multimedia scene, and the strategy data defines at least one variable coding strategy of the sub-graph identified by the identification data, said at least one variable coding strategy representing in an unitary manner a plurality of different possible types of coding and specifying how the type of coding to be used in said subsequent variable coding process is to be varied as a function of at least one of the at least one attribute, the at least one property, and the at least one parameter that applies to the scene graph;

identify said sub-graph of said scene graph, from the identification data extracted from said representation, said sub-graph corresponding to at least one scene element destined to undergo a variable coding process that varies as a function of a configuration of use conditions of the scene graph, wherein the configuration of use conditions of the scene graph comprises a set of use conditions selected in the group consisting of: at least one attribute of a terminal rendering the multimedia scene, at least one property of a transmission channel that transmits said scene graph to the terminal, and at least one parameter of a user profile of a user of the terminal rendering the multimedia scene, the sub-graph being generic to, but independent of, the different possible configurations of use conditions of the scene graph;

determine a value of at least one of the at least one attribute, the at least one property, and the at least one parameter that applies to the scene graph; and code said sub-graph by application of at least one coding process taking into account the value of at least one of the at least one attribute, the at least one property, and the at least one parameter, in accordance with said strategy data.

13. The device according to claim 12, wherein said processor is configured to code said sub-graph based on code extracted from said scene graph.

14. The device according to claim 12, further comprising:
a rendering engine capable of reconstituting said multimedia scene.

15. The process according to claim 1, further comprising a step of outputting, as said enriched representation of the multimedia scene, said scene graph modified by addition of said identification data and data strategy.

16. The device according to claim 5, wherein the processor is further configured to output, as said enriched representation of the multimedia scene, said scene graph modified by addition of said identification data and strategy data.

17. The method according to claim 9, wherein the extraction step comprises extracting from said representation a parent node indicating that a child thereof is susceptible to undergo a subsequent variable coding process that varies as a function of the configuration of use conditions of the scene graph.

18. The device according to claim 12, wherein the processor is configured to extract said identification information from said representation by extracting from said representation a parent node indicating that a child thereof is susceptible to undergo a subsequent variable coding process that varies as a function of the configuration of use conditions of the scene graph.

19. The process according to claim 1, further comprising applying a constraint to the scene graph, wherein the constraint is a function that is dependent on time, and wherein the constraint is linked to a bandwidth of a network to ensure adaptive compression or is linked to the profile of the user during installation of a multimedia companion for a handicapped person.

* * * * *